United States Patent Office 2,740,777
Patented Apr. 3, 1956

2,740,777
PROCESS OF PRODUCING 4-CARB-LOWER ALKOXY-3-METHYL-4-PHENYL-N-LOWER ALKYL-AZACYCLOHEPTANES AND CERTAIN PRODUCTS

Julius Diamond, Philadelphia, and William F. Bruce, Havertown, Pa., assignors to American Home Products Corporation, New York, N. Y., a corporation of Delaware No Drawing. Application October 7, 1953,
Serial No. 384,776

5 Claims. (Cl. 260—239)

This invention relates to cyclic compounds, more particularly azacycloalkanes and the method for preparing them.

The present invention is a continuation-in-part of application Serial No. 297,185, filed July 3, 1952, now Patent No. 2,666,050.

The preparation of the compounds of the invention involves the alkylation of a 2-aryl-4-dialkylamino butyronitrile with a polymethylene sulfonic acid ester or halide having 3 methylene groups, this reaction being carried out in the presence of a reagent capable of displacing active hydrogen. Following the alkylation reaction, the product obtained is cyclized to form a cyclic quaternary ammonium compound utilizing a highly polar solvent. The cyclic compound thus produced is then partially split or decomposed and, as a final procedure, the compound so treated is hydrolyzed and then esterified to prepare the carbalkoxy compound, or the cyanoazacycloalkane may be reacted with an alkyl Grignard or alkyl-lithium and then hydrolyzed to form an acyl azacycloalkane. A related alkylation product is cyclicized merely by heating, utilizing a high boiling inert solvent. The corresponding cyclic compound produced is then treated as described above.

The following reactions will illustrate the process steps:

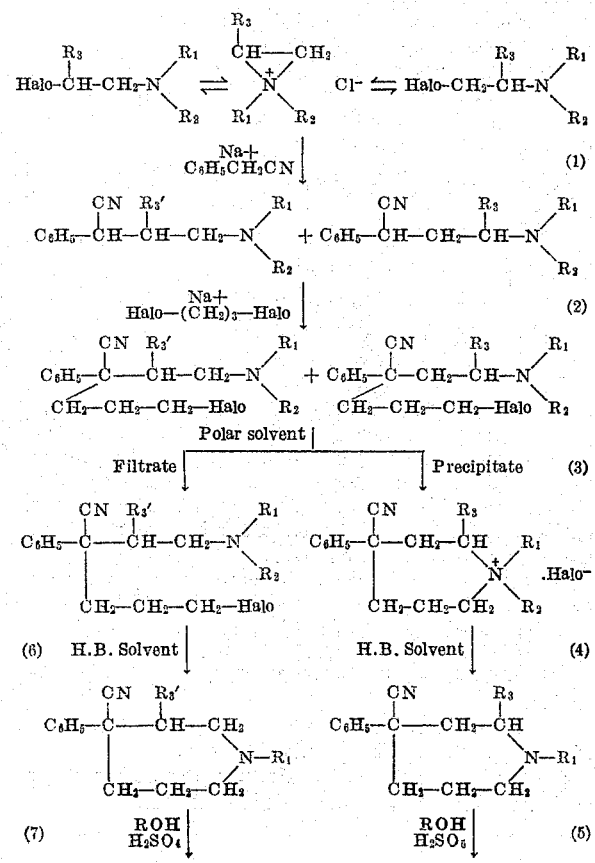

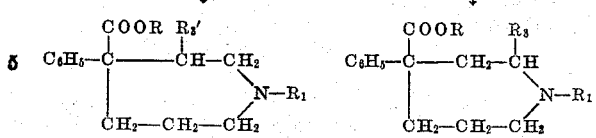

The radicals R, $R_1$, $R_2$, $R_3$ and $R_3'$, which may be either similar or dissimilar to each other, are intended to stand for lower alkyls and preferably alkyls of 1 to 4 carbon atoms. More preferably, R will stand for methyl or ethyl while $R_1$, $R_2$, $R_3$ and $R_3'$ preferably stand for methyl radicals.

With regard to the halo- and di-halo reactants, the designation "halo" is intended to stand for either chlorine, bromine or iodine. It may be noted that the halogen groups may be similar, i. e., all standing for bromine, for example, or they may be dissimilar, one standing for bromine and the other for chlorine.

The starting compounds meeting the qualifications noted hereinabove, which may be prepared by well-known procedures, are reacted in the presence of a reagent capable of displacing active hydrogen, preferably an alkali metal amide such as sodium, potassium or lithium amide although sodium metal, alkali metal alcoholates, phenyl-sodium, phenyl-lithium or butyl-lithium are also operable. The reaction is carried out in the presence of a solvent which may be either lower alkyl ethers, such as ethyl ether or an aromatic hydrocarbon such as benzene, toluene or xylene. Substantially anhydrous conditions should be utilized for best results and, while not necessary, an inert atmosphere, such as nitrogen gas, is desirable for the reaction. The reaction goes easily at ordinary temperatures, and, although room temperature or a temperature from about 10° to 35° C. is preferred, one may operate in the broader range from about −10° C. to about 50° C.

The cyclization of the alkylated product produces new and useful cyclic compounds. It has been found that when the 1-alkyl-1-tertiary-amino-haloalkyl cyanides are heated in the presence of a highly polar organic compound having a relatively high dielectric constant or dipole moment, a cyclization of the amino-haloalkane takes place resulting in the formation of a cyclic quaternary ammonium compound. The temperature of reaction may range from about 70° to about 120° C., a preferred temperature being in the neighborhood of 100° C.

The preferred procedure for carrying out cyclization Reaction 3 comprises solubilizing the aminonitrile in the polar solvent to form a solution ranging from about 0.1–5.0 moles per liter and heating the mixture until no more salt precipitates out. If desired, one may use in addition to the polar solvent any solvent which will make the reaction product less soluble therein. Thus, hydrocarbon solvents such as heptane, benzene, toluene, xylene, etc., have been found suitable in admixture with the polar solvent. While the preferred dilution in the solvent is approximately 1.0 mole per liter or the range as stated above, one may obtain satisfactory results with a dilution as high as .01 molar or in this neighborhood. While it has been indicated that the proper concentration of alkylation product in the solvent or solvents may merely be made up and heated, one may also carry out the reaction by heating the solvent and admitting the alkylation product thereto in small amounts. It has been found that in high concentrations, such as about 5.0 moles or greater, the reaction yields are excellent but the quality of product is poor, whereas in the low concentrations, such as .001 molar or lower, while the quality of product is good, the yields are so low as to make the process uneconomic.

The polar solvent selected has been found to be an important factor in the cyclization process illustrated by Reaction 3. Highly polar solvents were discovered to give very satisfactory results, such solvents having a dipole moment under standard conditions (20° C.) of about 2.5 Debye units to about 4.5 Debye units or somewhat less. The dielectric constant should have a value (epsilon) above 10 and preferably from about 15 to 40 when measured under standard conditions. The solvent selected should also have a boiling point above about 70° C. As examples of highly polar solvents may be mentioned nitrobenzene, orthonitrotoluene, benzonitrile, 2-nitropropane and solvents of like nature.

The procedure for cyclizing the 2-alkyl haloalkane cyanides involves the use of a high boiling inert solvent and reacting these nitrile compounds under refluxing conditions in the range of about 150° to about 300° C. Preferably, higher alcohols, such as undecanol, are used although mineral oils, such as heavy naphtha or kerosene, are also effective. At about 150° C., the corresponding quaternary ammonium compound is believed to form, and, as the heating proceeds, alkyl halide is released, indicating the formation of the azacycloheptane.

To prepare the novel azacycloalkanes from the quaternary salt, the latter is decomposed to remove alkyl halide. This decomposition reaction is carried out by heating the quaternary in the range of about 200 to about 250° C. If desired, an inert organic solvent may be used, such solvent being selected with a boiling range within the reactive temperature range noted and under refluxing conditions. The higher alcohols have been found especially effective although mineral oils such as heavy naphtha or kerosene are also useful. The alcohols mentioned are partial solvents for the quaternary salt as well as the reaction product.

When the cyclic reaction product stays in solution in the solvent, it may be removed by a solvent extraction procedure. For this step, the reaction mixture is extracted with a concentrated mineral acid in aqueous solution which is separated and washed. The washed extract is now made alkaline and is then solvent extracted, using ether or other solvent in which the free base is soluble. The latter may then be isolated by distilling off the solvent.

Following the preparation of the cyclic aminonitrile, the latter may then be either hydrolyzed to an acid and then esterified, or it may be changed to an acyl group by alkyllithium or an alkyl Grignard followed by hydrolysis. To form the acid-ester, the aminonitrile is hydrolyzed under either acid or alkaline conditions. For acid hydrolysis, one may use any strong acid such as syrupy phosphoric acid, concentrated hydrobromic acid, etc., although 80–95% sulfuric acid is preferred. Alkaline hydrolysis is also feasible, and, as an example, potassium hydroxide in an alkylene glycol will give the desired product. The hydrolysis reaction may be carried out at a temperature of about 100–150° C. with a more preferred range of about 110–120° C.

The cyclic acid or salt obtained as a product of the hydrolysis step is then esterified using a substantially anhydrous lower aliphatic alcohol, preferably one having no more than three carbon atoms and, more preferably, using methyl or ethyl alcohol. The final cyclic ester may be obtained by concentration of the esterification reaction mixture, neutralizing with an aqueous alkaline solution, extracting the free base with a selective solvent and finally distilling off the solvent medium.

As a specific illustration of the process, the following procedure will serve to describe the invention in greater detail.

EXAMPLE

*4-dimethylamino-3- and 4-methyl-2-phenyl-n-butyronitrile*

To a solution of 1.43 moles (167.6 g.) of phenylacetonitrile in 250 ml. of toluene was added 1.29 mole (50.3 g.) of sodamide at such a rate as to maintain the temperature at 35–40°. The addition was effected under a nitrogen atmosphere with stirring. After an additional 2 hours at 35–40°, the mixture was cooled to 5°. A dry toluene solution of 1-dimethylamino-2-chloropropane, prepared the same day from 1.23 moles (193 g.) of the hydrochloride and 1.37 moles (54.6 g.) of sodium hydroxide in 500 ml. of water and 250 ml. of toluene, was then added dropwise at 5–10°. This temperature was maintained an additional hour, then it was allowed to rise to room temperature and stand overnight. The mixture was washed with water, extracted with 6 N-hydrochloric acid, the acid extract washed with ether, basified, and extracted with ether. The ether extract was dried, filtered, and distilled. A mixture of the isomers of the butyronitriles boiled at 95–8° (0.2 mm.), $n_D^{28}$ 1.5028.

*1-dimethylamino-1- and 2-methyl-3-phenyl-6-chlorhexane*

To a stirred solution of 0.85 mole (172.8 g.) of a mixture containing 4-dimethylamino-3- and 4-methyl-2-phenyl-n-butyronitrile in 1.2 l. of toluene under a nitrogen atmosphere, was added portionwise 1.09 moles (42.6 g.) of sodamide. The rate of addition was controlled so as to maintain the temperature at 35–40°. This temperature was kept an additional 2 hours. The red solution was cooled to −30° in a Dry Ice-acetone bath, and 0.898 mole (141.3 g.) of trimethylene chlorobromide in 250 ml. of toluene was added at such a rate as to maintain the temperature between −25° and −15°. This temperature was maintained an additional ½ hour then the stirred mixture was allowed to warm to room temperature and stand overnight. The mixture was filtered and the toluene distilled from the filtrate at 30–35° (35 mm.). The liquid residue contained a mixture of the 1- and 2-methyl chlorhexanes.

*4-cyano-1,2-dimethyl-4-phenylazacycloheptane methochloride*

Liquid residue from the preceding step was diluted to 850 ml. with nitrobenzene and the resulting solution heated at 100° for 17 hours to precipitate the quaternary salt. The cooled mixture was filtered and the precipitate washed several times with acetone to give essentially pure 2-methyl quaternary salt, M. P. 251–251.5° dec. Recrystallization from ethanol gave fine white crystals, M. P. 259° dec. The filtrate was saved for preparation of the 3-methylazacycloalkane.

*Analysis.*—Calcd. for $C_{16}H_{23}ClN_2$: C, 69.00; H, 8.32; N, 10.05; Cl, 12.70. Found: C, 68.46; H, 8.73; N, 10.29; Cl, 12.14.

The filtrate from the quaternary salt contained the 2-methyl chlorhexane unchanged.

*4-cyano-1,2-dimethyl-4-phenylazacycloheptane*

0.378 mole (105.7 g.) of the 2-methyl quaternary was suspended in 378 ml. of undecanol (B. P. 225°). The mixture was heated to its reflux temperature with stirring, whereupon the solid dissolved with evolution of methyl chloride gas. The stirring and refluxing was continued until the evolution of gas was negligible. The solution was cooled under nitrogen and extracted with 6 N-hydrochloric acid. The acid extract was washed with ether, basified, extracted with ether, the ether extract dried, filtered, and the solvent removed.

Distillation of the liquid residue gave the 2-methyl cyano base, B. P. 123–6° (0.2 mm.), $n_D^{27}$ 1.5341, $d_4^{27}$ 1.019.

*Analysis.*—Calcd. for $C_{15}H_{20}N_2$: C, 78.90; H, 8.83; $M_D$ 69.54. Found: C, 78.50; H, 8.78; $M_D$ 69.40.

The picrate, M. P. 199–202° dec., was prepared in methanol.

*Analysis.*—Calcd. $C_{21}H_{23}N_5O_7$: C, 55.15; H, 5.07; N, 15.31. Found: C, 55.23; H, 5.06; N, 15.36.

The methiodide, M. P. 254–5°, was prepared from the methochloride with sodium iodide in methanol.

*Analysis.*—Calcd. for $C_{16}H_{23}IN_2$: C, 51.9; H, 6.26; N, 7.57; I, 34.26. Found: C, 52.02; H, 6.38; N, 7.45; I, 34.3.

4-carbomethoxy-1,2-dimethyl-4-phenylazacycloheptane

Using a 32 g. (0.14 mole) of the 2-methyl cyano base, 42 g. of 98% sulfuric acid, 9.9 ml. of water, and 250 ml. of methanol, the methyl ester was prepared essentially by the procedure described for the 2-methyl ethyl ester.

Final purification by vacuum distillation gave colorless liquid, B. P. 120–2° (0.25 mm.) $n_D^{32}$ 1.5250, $d_4^{32}$ 1.060 M$_D$ (obs.) 75.45, M$_D$ (calcd.) 76.06.

The picrate, M P. 159–61°, was prepared in methanol-ether.

The hydrochloride, M. P. 206–7°, was prepared in ether.

Analysis.—Calcd. for $C_{16}H_{24}ClNO_2$: C, 64.55; H, 8.12; N, 4.71; Cl, 11.91. Found: C, 64.13; H, 8.35; N, 4.69; Cl, 12.10.

4-carbethoxy-1,2-dimethyl-4-phenylazacycloheptane

A mixture of 64.0 g. (0.28 mole) of the 2-methyl cyano base, 84.0 g. of 98% sulphuric acid, and 19.8 ml. of water was heated at 115–20° for 3 hours. After cooling somewhat, 375 ml. of absolute ethanol was added and the mixture refluxed for 24 hours. The alcohol was distilled off at 760 mm., then the cooled residue poured into ice-cold saturated sodium carbonate solution and extracted with ether. The ether extract was dried, filtered, and the solvent removed.

Vacuum distillation of the liquid residue gave the 2-methyl ethyl ester, B. P. 122–4° (0.25 mm.), $n_D^{26}$ 1.5207, $d_4^{26}$ 1.035.

Analysis.—Calcd. for $C_{17}H_{25}NO_2$: C, 74.15; H, 9.15; N, 5.09; M$_D$ 80.68. Found: C, 74.69; H, 9.31; N, 5.92; M$_D$ 80.92.

The picrate, M. P. 177–8°, was prepared in methanol-ether

Analysis.—Calcd. for $C_{23}H_{28}N_4O_9$: S, 54.70; H, 5.59; N, 11.10. Found: C, 54.68; H, 5.72; N, 11.63.

The hydrochloride, M. P. 145–146.5°, was prepared by passing an equivalent weight of dry hydrogen chloride gas into a solution of 1 g. of base in 2 ml. of n-butyl acetate and 1 ml. of ether. Crystals were deposited after the solution was kept at 5° C. for 24 hours.

Analysis.—Calcd. for $C_{17}H_{26}ClNO_2$: C, 65.50; H, 8.41; N, 4.49; Cl, 11.37. Found: C, 65.30; H, 8.44; N, 4.36; Cl, 11.36.

The acid sulfate, M. P. 110–4°, was prepared by adding 0.12 mole of sulfuric acid to a solution of 0.10 mole of base in 50 ml. of methyl iso-butyl ketone and 50 ml. of ether at 5° C. The salt which precipitated out was recrystallized from ethyl iso-butyl ketone.

Analysis.—Calcd. for $C_{17}H_{27}NO_6S$: C, 54.68; H, 7.29; N, 3.75; S, 8.58. Found: C, 54.64; H, 7.21; N, 4.04; S, 8.50.

At times, one may merely wish solutions of the salts, when isolation of a solid product is undesired. Solutions of the organic acid addition salts were prepared by adding the base to an equivalent amount of the appropriate acid in water or water-alcohol mixtures.

4-carbo-isopropoxy-1,2-dimethyl-4-phenylazacycloheptane

To 32.0 g. (0.14 mole) of 4 - phenyl-4-cyano-1,2-dimethylazacycloheptane, was added a cooled solution of 42.0 g. of 98% sulfuric acid and 9.9 ml. of water. The mixture was heated in an oil bath for 3 hours at 110–120° C. (mostly at 120° C.).

After cooling to 80–90° C., this product was mixed with 187 cc. of iso-propyl alcohol and refluxed for 24 hours. At end of the reflux period most of the alcohol was distilled off and another 187 cc. of iso-propyl alcohol added; this was also distilled off. Care was taken not to distill over all the alcohol, a very small amount was left, so that the residual liquid would not become overheated.

The residual liquid was cooled and poured into an excess of a solution at saturated sodium carbonate. The product was extracted three times with ether; all the ether extracts were dried over anhydrous potassium carbonate, filtered and the ether removed at 250 mm.

Final purification by vacuum distillation gave the final product as a colorless liquid, B. P.=118–20° C./0.25 mm. $n_D^{27°}$=1.5160, $d_4^{27°}$=0.999. M$_D$ (calcd.)=85.30 M$_D$ (obs.)=87.03.

The picrate, M. P.=193–4° C. dec., was prepared in methanol-ether.

4-carbo-n-propoxy-1,2-dimethyl-4-phenylazacycloheptane

To 32.0 g. (0.14 mole) of 4-phenyl-4-cyano-1,2-dimethylazacycloheptane, was added a cooled solution of 42.0 g. of 98% sulfuric acid and 9.9 ml. of water. The mixture was heated in an oil bath for 3 hours at 110–120° C. (mostly at 120° C.).

After cooling to 80–90° C., this product was mixed with 187 cc. of n-propyl alcohol and refluxed for 24 hours. At the end of the reflux period most of the alcohol was distilled off and another 187 cc. of n-propyl alcohol added; this was also distilled off. Care was taken not to distill over all the alcohol, a very small amount was left, so that the residual liquid would not become overheated.

The residual liquid was cooled and poured into an excess of a solution of saturated sodium carbonate. The product was extracted three times with ether, all the ether extracts were dried over anhydrous potassium carbonate, filtered and the ether removed at 250 mm.

Final purification by vacuum distillation gave the final product as a pale yellow liquid, B. P.=128–30° C./0.25–0.30 mm. $n_D^{27.5}$=1.5160, $d_4^{27.5}$=1.012. M$_D$ (calcd.)= 85.30. M$_D$ (obs.)=86.39.

The picrate, M. P.=169–71° C., was prepared in methanol-ether.

4-cyano-1,3-dimethyl-4-phenylazacycloheptane

The filtrate from the preparation of the cyclic quaternary salt was extracted with 6 N-hydrochloric acid. The acid extract was washed with ether, basified with 4 N sodium hydroxide solution, and then extracted with ether. The ether extract was dried over anhydrous potassium carbonate, filtered, and the ether distilled off. The liquid residue contained the 2-methyl chlorhexane. It was diluted to 1.16 l. with undecanol. This solution was added dropwise to 580 ml. of refluxing and stirred undecanol (B. P. 225°). Methyl chloride gas was evolved. The stirring and refluxing were continued until the gas evolution became negligible. The solution was cooled under nitrogen and then extracted with 6 N-hydrochloric acid. The acid extract was washed with ether, basified with 4 N sodium hydroxide solution, and then extracted with ether. The ether extract was dried over anhydrous potassium carbonate, filtered, and the ether distilled off. Vacuum distillation of the liquid residue gave essentially pure 3-methyl cyano base, B. P. 117–20° (0.25 mm.), $n_D^{26}$ 1.5330, $d_4^{26}$ 1.016.

Analysis.—Calcd. for $C_{15}H_{20}N_2$: C, 78.90; H, 8.83; N, 12.27; M$_D$ 69.54. Found: C, 78.41; H, 8.89; N, 11.65; M$_D$ 69.80.

The picrate, M. P. 195–7° dec., was formed in methanol and recrystallized from acetone-methanol.

Analysis.—Calcd. for $C_{21}H_{23}N_5O_7$: C, 55.15; H, 5.07; N, 15.31. Found: C, 55.44; H, 5.28; N, 15.83.

The hydrochloride, M. P. 258–9°, was formed in ether and recrystallized from acetone.

Analysis.—Calcd. for $C_{15}H_{21}ClN_2$: C, 68.05; H, 7.99; N, 10.59; Cl, 13.39. Found: C, 67.89; H, 7.95; N, 10.25; Cl, 13.52.

The 3-methyl cyano base could be further purified through its hydrochloride which was relatively insoluble in cold acetone as compared to the analogous 2-methyl compound, which was readily soluble in the same solvent.

The acid sulfate, M. P. 224–6°, was formed in 80% sulfuric acid and precipitated with acetone.

*Analysis.*—Calcd. for $C_{15}H_{22}N_2O_4S$: C, 55.21; H, 6.79; N, 8.58; S, 9.82. Found: C, 55.26; H, 6.85; N, 8.46; S, 9.80.

The methiodide, M. P. 259–61°, was prepared in acetone.

*Analysis.*—Calcd. for $C_{16}H_{23}IN_2$: C, 51.9; H, 6.26; N, 7.57; I, 34,26. Found: C, 51.83; H, 6.52; N, 7.80; I, 34.8.

4-carbethoxy-1,3-dimethyl-4-phenylazacycloheptane

A mixture of 20.7 g. (0.13 mole) of the 3-methyl cyano base, 39.0 g. of 98% sulfuric acid, and 9 ml. of water was heated at 115–20° for 3 hours. After cooling somewhat, 175 ml. of absolute ethanol was added, and the mixture refluxed for 24 hours. The excess alcohol was distilled off at 760 mm., the cold residue poured into an ice-cold saturated solution of sodium carbonate, and the mixture extracted with ether. The ether extract was dried over anhydrous potassium carbonate, filtered, the ether removed, and the liquid residue vacuum distilled to give the 3-methyl ethyl ester. B. P. 119–21° (0.25 mm.), $n_D^{23.5}$ 1.5202, $d_4^{23.5}$ 1.045.

*Analysis.*—Calcd. for $C_{17}H_{25}NO_2$: C, 74.15; H, 9.15; N, 5.09; $M_D$ 80.68. Found: C, 74.26; H, 9.01; N, 5.63; $M_D$ 80.40.

The picrate, M. P. 160–2°, was prepared in isopropanol.

*Analysis.*—Calcd. for $C_{23}H_{28}N_4O_9$: C, 54.70; H, 5.59; N, 11.10. Found: C, 54.66; H, 5.51; N, 11.37.

The hydrochloride, M. P. 197–9° dec., was prepared in methyl isobutyl ketone and recrystallized from acetone.

*Analysis.*—Calcd. for $C_{17}H_{26}ClNO_2$: C, 65.50; H, 8.41; N, 4.49; Cl, 11.37. Found: C, 65.28; H, 8.60; N, 4.60; Cl, 11.87.

The 3-methyl ethyl ester could be further purified through its hydrochloride which was relatively insoluble in cold methyl isobutyl ketone as compared to the analogous 2-methyl compound, which was readily soluble in the same solvent.

The quaternary salts obtained by the cyclization procedure described above are deemed capable of utilization as valuable wetting agents. The azacycloalkanes have numerous uses. One important use is in the formation of long-chain aliphatic quaternary compounds which may be prepared in known manner by reacting the cycloalkanes with a long-chain aliphatic halide having from 8 to 18 carbon atoms, such as lauryl bromide, the temperature of reaction ranging from about 50° to about 150° C. Still another use of these alkylenimine compounds is in their ability to combine with penicillin to form salts therewith, this procedure being useful in purifying penicillin and even obtaining therapeutically valuable penicillin salts. In addition, a number of the azacycloheptanes have been found to have valuable pharmacological effects, notably an unexpectedly good analgesic action. The above uses apply equally to the free bases or their acid-addition salts.

All of the azacycloalkanes are asymmetrical and the product obtained is a recemic mixture of optically active substances. If desired, these dl-compounds may be resolved into the dextro- and laevo-forms by combining the free base with an optically active organic carboxylic acid in a suitable solvent and selectively isolating the d- or l-stereoisomer.

The therapeutically useful compounds, more particularly those possessing analgesic action, may be utilized either orally, in suppository form or parenterally. For oral use, the compounds may be combined in known manner in the form of an elixir or other liquid form with excipients, such as suspending and flavoring agents. They may also be utilized in dry form, combined in the usual way with binding agents, sugars and other excipients for tablet or capsule form.

Having described our invention, what we claim is:

1. The process comprising heating a 3-cyano-1-di-lower alkylamino - 2 - methyl - 3 - phenyl-6-halohexane, wherein "halo" represents a halogen atom in the presence of a high boiling inert solvent to a temperature in the range of about 150° to about 300° C. thereby forming a 4-cyano-3-methyl-4-phenyl-N-lower alkyl - azacycloheptane and finally hydrolyzing and esterifying said 4-cyano compound to form a 4-carb-lower alkoxy-3-methyl-4-phenyl-N-lower alkyl-azacycloheptane.

2. The process of claim 1, wherein the high boiling solvent is undecanol.

3. The process of claim 1; wherein the high boiling inert solvent is a higher alcohol boiling below about 250° C.

4. A compound selected from the group consisting of 4-carbethoxy-1,3-dimethyl-4-phenyl-azacycloheptane and salts thereof.

5. As a new compound, 4-carbethoxy-1,3-dimethyl-4-phenylazacycloheptane.

References Cited in the file of this patent

UNITED STATES PATENTS 2,666,050   Diamond et al. _____ Jan. 12, 1954